April 9, 1957  J. BJORKSTEN  2,788,316
SOLAR STILL
Filed July 20, 1953
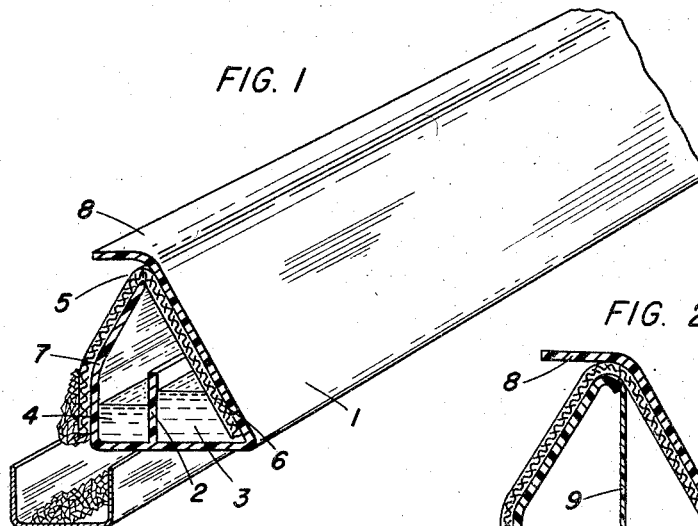
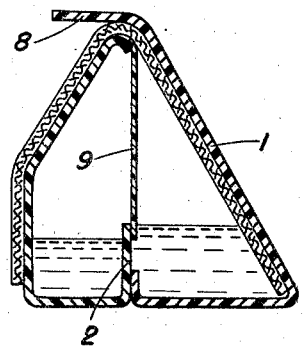
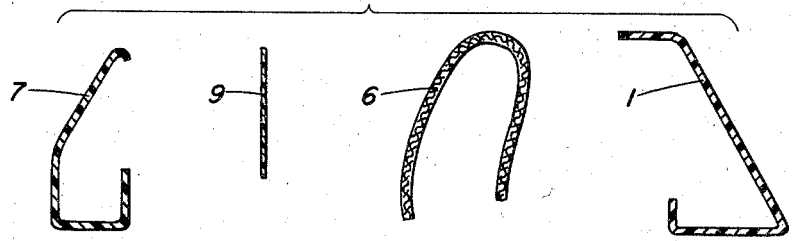
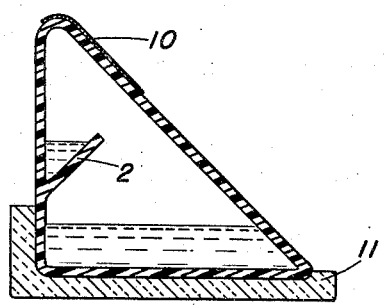
INVENTOR.
JOHAN BJORKSTEN
BY
Agent

2,788,316

SOLAR STILL

Johan Bjorksten, Madison, Wis.

Application July 20, 1953, Serial No. 368,992

6 Claims. (Cl. 202—234)

This invention relates to methods for utilizing solar energy, and it also relates to methods for preparing potable water from salt water such as sea water.

Heretofore many procedures have been suggested for this purpose, including various solar power actuated water distilling devices. These devices of prior art, however, have the disadvantage of inherently costly construction, high maintenance and insulation costs.

An object of the present invention is a solar power operated heat differential still, which can be made continuously, from extrudable plastic or other materials, in unlimited lengths. Due to the longitudinal extension of this distillation device, which for most applications will be measured in miles, a large total output can be obtained in spite of relatively low output per unit area.

Further objects will become apparent as the following detailed description proceeds.

In further describing the invention, reference is made to the drawings, of which Figure 1 is a perspective view showing partial cross-section, partial longitudinal aspect of one embodiment of the invention; Figure 2 shows a cross-section of another embodiment of the invention; Figure 3 shows, in cross-section, the component parts of the embodiment of Figure 2 before assembly; and Figure 4 shows, in cross-section, a still further embodiment.

Referring now to Figure 1, the device of the invention comprises a tube 1 of inherently unlimited length. This tube is longitudinally divided by a partition 2 into two parts, which are connected with each other in the space above the partition into two portions 3 and 4. In the upper part of the tube there is a slit 5 which is suitable to permit the placement of the wick 6 so that one portion of this wick is inside the compartment 3 and the other side of the wick is outside the tube essentially covering wall-section 7 of this tube on the opposite side. Above the wick the tube is extended to an overhanging portion 8. The stills thus constituted are desirably at least 100 feet long, and preferably more than ¼ mile long.

In using the invention, section 3 is filled with saline water and the entire device is so oriented that the sun preferentially impinges on the side of the tube which holds the saline water and in which the wick is inside the tube. The saline water in 3 is sucked by capillary forces onto wick 6 through slit 5 and onto the portion of the wick which hangs outside the tube on side 7 opposite the salt water side. Thus the saline water will evaporate from the device and this induces cooling of wall 7. This results in a cooling in this wall so that a temperature differential exists between wall 7 on one hand, and salt water compartment 3 and the opposite wall of the tube on the other hand.

As a result, water will evaporate from section 3 and from the wick over section 3 and will condense on the shaded and evaporation cooled wall 7. This water will accumulate into section 4 of the tube, and can be drained off through a drainage opening or openings (not shown).

A somewhat different embodiment is shown in cross-section in Figure 2. Here the tube has been made by extrusion in longitudinal sections, and these have been cemented together at partition 2. In addition, there is provided a thin moisture vapor, but water impermeable diaphragm 9 which has for its purpose to prevent saline water from being splashed over into the distilled water section when the tube is handled or when salt water is pumped into the tube.

Figure 3 shows the component parts of Figure 2 before assembly.

Figure 4 shows a still different embodiment. Here the wick has been dispensed with, and instead temperature differential is achieved by means of a reflective coating 10 in the upper portion of the tube. The lower portion is placed in a heat insulating dark cradle 11. The partition is oblique and set so as to catch any water condensing in the area from which heat radiation is reflected by means of the reflecting coating 10.

In embodiments 1 and 2 it may also be desirable to place such a reflectant coating on the overhang portion 8 for still better shielding of the cool wall section.

From the standpoint of manufacture, I prefer to extrude separately the salt water and the potable water halfs of the device, and then to glue them together adhesively, employing and inserting the porous membrane as they are being assembled. The wick is also positioned before the two halfs are adhered together. As adhesive I may use a solution of the plastic of which the device is made or a solvent therefor, or I may use any other suitable adhesive of sufficient bond strength to the plastic used. I may also heat-weld the sections. The wick 6 is made from a material to which salt crystals have relatively low adhesion such as, for example, polyacrylates, polyvinyl chloride, polyvinylidene chloride fabric, glass, nylon, or polyacrylonitrile fabric. Generally speaking, synthetic fabrics having a high degree of slickness and sodium chloride repellance are preferred. The wick is preferably colored black, or dark, for maximum heat absorption, at least in the section inside the tube.

The salt accumulated on the wick may be removed periodically or it may be arranged to drop by gravity into a trench which is suitably positioned paralleling the still tube.

As construction material, I basically prefer to employ transparent plastics, having a dimensional stability adequate for the purpose intended. For instance heat stabilized acrylics, polyacrylonitriles, polyvinylidene or polyvinyl chloride, sulfur dioxide-butene type, or other sulfon resins, polyfluorochloroethylenes, polystyrenes, polyethylenes, co-polymers of the above, and the like, may be employed. To facilitate entry of the radiation, I may use a thin film, adhered over a slot in the extruded tube, as the wall on the salt water side.

The water vapor permeable membrane 9 is convenient in order to prevent accidental splashing or intermingling of salt water and potable water; however it is not an absolute necessity for the invention. This membrane may be for example a very thin polyethylene membrane, or it may be a membrane of regenerated cellulose, or polyvinyl alcohol, or of any plastic, which is intermilled with a solid material of any kind which is not wettable by the plastic or with the solvent therefor used in milling or mixing. In this fashion small cracks in the membrane will exist through which water vapor can readily pass.

The cross-sectional form of the device is not critical, though it is preferred that the lower portion be broader than the upper portion, for convenience in positioning. The wall of the saline section 3 may be made of thin sheet or film stock adhesively bonded to the structure. The cross-sectional partition 2 should leave some vapor passage between the said sections and should be shorter in cross-section than the diameter of the pipe.

The reflective coating 10 may be either outside or inside of the tube, and may be applied as a reflective foil, a sprayed, spluttered vacuum deposited mirror film, aluminum paint, titanium oxide paint, or in any other manner known to the art, achieving high reflectivity for solar radiation.

It is thus obvious that the scope of the invention is broad and is not to be limited excepting by the claims, in which it is my intention to cover all novelty inherent in this invention as broadly as possible in view of prior art.

Having thus disclosed my invention, I claim:

1. A device for distilling salt water by solar energy, said device comprising in combination a tube divided into two longitudinally extended parallel channels defined by transparent walls having a vapor-admitting passage between them, and having further a dark colored opaque wick which covers substantially the entire upper portion of said device, being positioned inside said device on one side, extending through a slot at the apex of the device and positioned outside said device on the other side, said wick being made of a smooth synthetic material.

2. A tubular solar still characterized by a longitudinal partition throughout the length thereof, said partition dividing said tubular still longitudinally into two channels; said partition being lower than the height of said still; further characterized by a longitudinal slit in the upper portion thereof and a dark colored opaque wick passing through said slit, said wick extending substantially along both sides of said still, inside the still on one side and outside the still on the other side, said sides being transparent.

3. Solar distillation apparatus consisting essentially of a first channel adapted to contain liquid which contains impurities, a second channel adapted to contain distilled liquid, parallel and adjacent to said first channel and separated therefrom by a common side, condensing means consisting of a first non-porous wall extending upwardly from the side of said second channel furthest from said first channel and inwardly over said channel, a transparent second non-porous wall extending upwardly from the side of said first channel furthest from said second channel and inwardly over said first channel spaced above and apart from said first wall and extending thereover, means for cooling said condensing means consisting of a sheet of opaque dark colored liquid-absorbent material overlying and in contact with said first wall, said sheet extending through the space between said first and second walls and substantially closing said space to the passage of air therethrough other than through passages within said sheet, thence extending downwardly, underlying and in contact with said second wall, into said first channel.

4. Solar distillation apparatus consisting essentially of a first channel adapted to contain liquid which contains impurities, a second channel adapted to contain distilled liquid, parallel to said first channel, condensing means consisting of a first non-porous wall extending upwardly from the outer side of said second channel, a transparent second non-porous wall extending upwardly from the outer side of said first channel, the upper portion thereof being spaced apart from the top edge of said first wall to provide a slit thereinbetween, and means for cooling said condensing means consisting of a sheet of opaque dark colored liquid absorbent material overlying and in contact with said first wall.

5. Solar distillation apparatus consisting essentially of a first channel adapted to contain liquid which contains impurities, a second channel adapted to contain distilled liquid, parallel to said first channel, condensing means consisting of a first non-porous wall extending upwardly from the outer side of said second channel, a transparent second non-porous wall extending upwardly from the outer side of said first channel, the upper portion thereof being spaced apart from the top edge of said first wall to provide a slit thereinbetween, and means for cooling said condensing means consisting of a sheet of opaque dark colored liquid absorbent material overlying and in contact with said first wall, said sheet extending through the slit between said first and second walls and occupying substantially the entire area of said slit, thence extending downwardly, underlying and in contact with said second wall, into said first channel.

6. Solar distillation apparatus consisting essentially of a first channel adapted to contain liquid which contains impurities, a second channel adapted to contain distilled liquid, parallel and adjacent to said first channel, separated therefrom by a common partition and having a bottom substantially coplanar therewith, condensing means consisting of a first non-porous wall extending upwardly from the side of said second channel furthest from said first channel, a second transparent non-porous wall extending upwardly from the side of said first channel furthest from said second channel, spaced apart from the top edge of said first wall to provide a slit thereinbetween, and means for cooling said condensing means consisting of a sheet of opaque dark colored liquid absorbent material overlying and in contact with said first wall.

References Cited in the file of this patent

UNITED STATES PATENTS

| Number | Name | Date |
|---|---|---|
| 2,398,292 | Delano | Apr. 9, 1946 |
| 2,402,737 | Delano | June 25, 1946 |
| 2,413,101 | Delano | Dec. 24, 1946 |
| 2,427,262 | Delano | Sept. 9, 1947 |
| 2,445,350 | Ginnings | July 20, 1948 |
| 2,455,835 | Ushakoff | Dec. 7, 1948 |